United States Patent Office 3,748,282
Patented July 24, 1973

3,748,282
PRODUCTION OF SHAPED MAGNESIUM
OXIDE COMPOSITIONS
Robert D. Evans, Hackensack, N.J., assignor to
Dart Industries Inc., Los Angeles, Calif.
No Drawing. Filed Oct. 4, 1971, Ser. No. 186,460
Int. Cl. B01j 11/06, 11/32
U.S. Cl. 252—471                                  9 Claims

ABSTRACT OF THE DISCLOSURE

Shaped magnesium oxide compositions having a good balance of properties including catalytic activity may be produced by slaking a quantity of magnesium oxide in an aqueous solution of a water miscible volatile organic compound, drying the slaked mixture to a specified wetness, granulating and compacting the dried mixture into a desired shape and calcining the shaped mixture to convert a portion of the magnesium hydroxide formed during slaking to magnesium oxide.

---

This invention relates to a process for producing magnesium oxide compositions in tablet or pellet forms which have improved properties.

Magnesium oxide compositions are known to be useful as adsorbents and as catalysts in conversion of hydrocarbon materials. Various physical forms of the compositions have been utilized and, in particular, in the catalyst area there have been used porous tablets, pellets and briquettes having high surface area for greater catalytic activity. Such uses require the catalysts to have good strength properties so as to be able to withstand compressive forces encountered in catalyst beds and to be able to withstand various regeneration techniques without disintegration.

In accordance with this invention there is provided a process for producing magnesium oxide compositions in shaped forms, e.g. tablets, pellets, and the like, which have high porosity (and high surface area) for high catalytic activity yet still has good strength during use to function for long periods of time without disintegration. Briefly, the general process involves slaking a quantity of particulate magnesium oxide with a solution mixture of a water miscible volatile organic compound and water so as to convert between 30% to 85% by weight of the MgO to Mg(OH)$_2$, drying the resulting slurry to a wetness of about 5 to 18% by weight at a temperature below the temperature at which the Mg(OH)$_2$ is converted back to MgO, granulating the resulting mixture if necessary and shaping and compacting the mixture into the desired form, and then calcining the shaped forms at temperatures in the range of about 550° F. to 850° F. to convert the desired quantity of Mg(OH)$_2$ back to MgO as determined by the requirements of the final composition.

The magnesium oxide employed in the process preferably is in particulate form wherein about 99% of the particles pass through a 325 mesh screen. In addition, the impurities in the magnesium oxide should be such that the silica content does not exceed about 0.15% by weight, chlorine content does not exceed about 0.0025% by weight and calcium oxide content does not exceed about 0.20% by weight. While the above aspects are preferred, it is pointed out that the nature of the magnesium oxide used in the process has a significant effect on the strength of the ultimate shaped composition.

The solution mixture of a water soluble or water miscible liquid organic compound and water preferably comprises 40% to 90% by volume of water and 10% to 60% by volume of the organic compound, more preferably 40% to 60% by volume. In the process the solution functions to provide the necessary aqueous media for controlled conversion of the MgO to Mg(OH)$_2$ while at the same time providing a sufficient liquid media to absorb the exothermic heat of reaction and maintain the mixture as a slurry without setting up.

The water employed in this solution should be demineralized in order to reduce any possible contamination of the composition.

The water soluble or water miscible liquid organic compound must be sufficiently volatile that it will completely vaporize upon drying and subsequent calcining of the wet composition. It is desired that the liquid organic compound boil at a temperature below the calcining temperature at which Mg(OH)$_2$ is converted to MgO, i.e. about 550° F. as published in the literature. Preferably, the liquid organic compound has a boiling point of less than 212° F. It is pointed out that these compounds, in addition to the above requirements, must be inert to the magnesium compounds and any promoters present in the slurry. Some examples of suitable compounds include alcohols and ketones, more specifically alkanols having 1 to 8 carbon atoms and ketones having the formula

wherein each R is an alkyl group having 1 to 8 carbon atoms. Included in these groups are methanol, ethanol, propanol, isopropanol, butanol, iso-butanol, acetone, methylethyl ketone, and the like. Mixtures of such materials are also suitable.

In the first or slaking step of the process of this invention the magnesium oxide is merely added to the solution mixture as a single charge. Preferably, about 40% to 70% by weight of particulate magnesium oxide is added to 30% to 60% by weight of a solution mixture comprising water and about 10% to 60% by volume of the water miscible organic compound. This results in a highly exothermic reaction wherein the magnesium oxide is converted to the hydroxide form. Agitation should be employed to maintain a well mixed slurry and to help dissipate the heat throughout the liquid media with a minimum evolution of steam.

As indicated previously, the slaking step of the process is carried out to the extent that about 30% to 85% by weight of the magnesium oxide is converted to the hydroxide, preferably about 35% to 65% by weight. This aspect of the invention is considered to be essential in achieving the ultimate shaped compositions having the desired properties including porosity and strength as the magnesium hydroxide serves as a transitory type of binder for the initial shaping of the compositions and also provides a source of gas during the calcining step which leads to obtaining sufficient porosity of the composition.

Following the slaking step the resulting slurry may be drained of any excess liquid and dried to a liquid content or wetness in the range of about 5% to 18% by weight, preferably 7% to 14%. This degree of wetness permits the composition to be handled during the shaping operation and is necessary for good tableting. Drying may be accomplished in any known manner using vacuum, hot air, or otherwise, and temperatures up to below the temperature at which magnesium hydroxide is converted to magnesium oxide. Preferably, drying is accomplished at temperatures below 200° F.

Due to the method of slaking magnesium oxide using a solution mixture and controlling the conversion to magnesium hydroxide so as not to exceed about 85%, the substantially dry-appearing cake resulting from the drying step may be easily broken or granulated into relatively fine particles, e.g. sufficiently small to pass through a 16 to 20-mesh screen. These particles are then shaped into the desired physical form using conventional apparatus such as a tableting machine wherein tablets 3/16 inch by 3/16 inch may be formed. Other shapes and dimensions may also be formed.

In any event, whatever shape and dimensions are utilized the shaped compositions are subjected to a calcining operation to drive off all residual volatiles and reconvert the magnesium hydroxide to magnesium oxide to the extent desired. To achieve the desired properties of the shaped composition for catalyst utility it is preferred to convert sufficient magnesium hydroxide to the oxide form so that the final calcined composition contains about 35% to 55% by weight magnesium hydroxide. The calcining operation is conducted at temperatures in the range of about 550° F. to 850° F., preferably 600° F. to 700° F., for a time sufficient to complete the desired conversion as such conversion does not begin to take place until about 550° F. is reached according to the published literature. Since it is desirable to remove all residual volatiles, particularly the water miscible organic compound, from the composition during this step prior to completing the desired conversion of the magnesium hydroxide to magnesium oxide it will be readily understood as to the preference for using a liquid organic compound boiling below 212° F. with water in forming the solution mixture which is used in the slaking step. Any residual solution mixture of this type present in the shaped compositions will quickly be volatilized completely at the high calcination temperatures employed.

After calcination, the resulting shaped composition contains the requisite ratio of magnesium oxide to magnesium hydroxide as hereinbefore described and possess the essential porosity and high surface area required for a highly active catalyst yet still have exceedingly good strength, particularly crush strength as would be necessary when such shaped catalyst compositions are employed in a bed.

In the above process, when the compositions are intended for use as catalysts, promoters may be included. These may typically be added to the slurry in the slaking step, either before, during or after the reaction converting the magnesium oxide to magnesium hydroxide. Such promoters include any known promoter such as manganese oxide, manganese sesquioxide, molybdenum oxide, uranium oxide, barium oxide, and possibly copper or potassium oxides, and the like. The quantity of promoter employed normally would be in the range of 3% to 6% by weight based on the total weight of the composition. Lesser or greater amounts may also be used but are generally ineffective on the lower side and produce little additional effect on the higher side.

Binders as are generally used in the art in preparing shaped compositions of this type are not necessary when employing the process of this invention. However, this does not mean that one could not employ them.

Lubricants may also be added to the composition to aid in shaping the compositions. Conventional lubricants such as magnesium stearate, aluminum stearate, high melting waxes, and the like, may be used in amounts ranging from 0.5% to 3% by weight as needed. These lubricants are preferably added to the granulated compositions after drying.

When the compositions produced by the above process are used as catalysts it is generally necessary to meet certain standards. The primary standards for activity and usefulness are the surface area of the shaped composition, its density and its crush strength. These characteristics are determined by the following methods.

Surface area may be determined using standard techniques and standard surface area measuring apparatus such as a Sor-Bet Model 5-7300 or an Adsorptomat Model 4-4680. A minimum surface area of 160 m.²/gm. is generally desired for satisfactory activity.

Strength is determined using a standard Stokes Crush-Strength apparatus. A minimum of about 5 pounds is desirable.

Density is calculated by any known method for solids such as by measurements of the buoyant force in a liquid of known density or by enclosing the shaped composition in a specific gravity bottle and determining the displacement. A minimum of about 1.3 gm./cc. is desirable to maintain activity.

It is found that the preferable combination of strength, surface area and density, occurs when the tablets are produced from a slaking step wherein approximately 35% to 65% of the magnesium oxide is converted to magnesium hydroxide and then subsequently reduced during calcination to the desired final level.

The invention is further illustrated by the following illustrative examples:

EXAMPLE 1

50 pounds of magnesium oxide (high purity) and 1 lb. 6 ozs. of manganese oxide were added to a suitable mixer and dry mixed for a period of five minutes. The magnesium oxide had a typical analysis of about 0.1% silica, about 0.0021% chloride and about 0.18% calcium. Next, about six gallons of a solution mixture of about 3.6 gallons dimineralized water and 2.4 gallons isopropyl alcohol (99% purity) were added as quickly as possible. A 35% conversion of magnesium oxide to magnesium hydroxide is achieved. The temperature of the mixer rose rapidly to about 65° F. The slurry was transferred to drying trays where the excess liquid was drained off and loose cake formed. The composition cake was then placed in a hot air dryer maintained at about 140° F. for a period of four hours where heated air is circulated over the cake. The dried cake containing about 10% by weight liquid is then removed from the dryer and granulated through a 16-mesh screen. Then the granules were passed through a Stokes tableting machine utilizing 3/16" standard concave punches and 3/16" premium steel dies where the composition was shaped into tablets suitable for use as a catalyst. The tablets were then placed on a conveyor and passed through a calcinating oven where the composition was calcined at 650° F. for six hours under atmospheric conditions. The properties of the tableted composition were found to be as follows:

Surface area about 165–170 m.²/gm.
Density about 1.3 gm./cc.
Pellet strength about 9 lbs.

EXAMPLE 2

In accordance with the general procedure outlined in Example 1 the preparation of compositions and shaping them into tablets were also attempted at various ratios of water to water soluble organic compound (isopropanol) in the slaking mixture and it was found that when the organic compound comprises 100, 90, 80 or 70% of the liquid portion of the slaking mixture, the samples would not tablet satisfactorily indicating that there was insufficient conversion of the magnesium oxide to magnesium hydroxide in the slaking step. Thus, a maximum of 70% by volume of the organic compound in the solution mixture during slaking is permitted to produce a suitable composition for shaping.

EXAMPLE 3

Compositions produced using 0–10% by volume of the organic compound in the liquid portion of the slaking mixture will result in conversion of from about 100% to about 90% of the magnesium oxide to the hydroxide form and the exothermic heat resulting is so great that the temperatures rise above 212° F. with substantial quantities of water evolved as steam. The compositions tend to set-up quickly and are difficult to further process. Moreover, while the compositions shaped into tablets show acceptable density and strength the surface areas are very low and the activity of the resulting pellet is below acceptable values.

Thus, having described the invention in detail it will be understood by those skilled in the art that various modifications may be made without departing from the spirit and scope of the invention described herein and in the appended claims.

I claim:
1. A process for producing a shaped magnesium oxide composition comprising the steps of:
   (A) slaking particulate magnesium oxide in an aqueous solution containing from about 10 to 70% by volume of a water miscible volatile organic compound selected from alkanols or ketones to convert between about 30% to about 85% by weight of the magnesium oxide to magnesium hydroxide,
   (B) drying the resulting slaked mixture to a wetness of about 5% to about 18% by weight at a temperature below a temperature at which the magnesium hydroxide is converted back to magnesium oxide,
   (C) granulating the dried mixture and compacting the mixture into the desired shape, and
   (D) calcining the shaped mixture at temperatures in the range of 550° F. to 850° F. to convert magnesium hydroxide back to magnesium oxide to the extent that the final shaped composition contains about 35% to about 55% by weight magnesium hydroxide.

2. A process according to claim 1 wherein the initial slaking mixture is formed by adding 40% to 70% by weight magnesium oxide to 30% to 60% by weight of the aqueous solution.

3. A process according to claim 2 wherein the aqueous solution comprises 40% to 90% water and 10% to 60% of a water miscible volatile organic compound.

4. A process according to claim 1 wherein the water miscible volatile organic compound is an alkanol having 1 to 8 carbon atoms, a ketone having the formula

wherein each R is an alkyl group having 1 to 8 carbon atoms, or mixtures thereof.

5. A process according to claim 4 wherein the water miscible volatile organic compound is isopropanol.

6. A process according to claim 1 wherein the dried mixture is compacted into pellet form prior to calcining.

7. A process according to claim 1 wherein a promoter is added to the mixture before compacting.

8. A process according to claim 7 wherein the promoter is manganese oxide or manganese sesquioxide.

9. A calcined magnesium oxide composition pellet produced in accordance with the process of claim 1 and having a surface area of at least about 160 m.²/gm., a crush strength of at least 5 lb. and a density of at least 1.2 gm./cc.

References Cited
UNITED STATES PATENTS

| | | | |
|---|---|---|---|
| 2,767,221 | 10/1956 | Ballard et al. | 252—475 X |
| 2,234,367 | 3/1941 | Chesny | 252—475 X |
| 3,305,311 | 2/1967 | Mayer et al. | 423—155 X |

DANIEL E. WYMAN, Primary Examiner

W. J. SHINE, Assistant Examiner

U.S. Cl. X.R.

252—475; 423—155, 164